United States Patent
Robel et al.

(10) Patent No.: US 7,490,466 B2
(45) Date of Patent: Feb. 17, 2009

(54) EXHAUST GAS RECIRCULATION AND SELECTIVE CATALYTIC REDUCTION SYSTEM

(75) Inventors: Wade J. Robel, Peoria, IL (US); Brett M. Bailey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 282 days.

(21) Appl. No.: 11/496,218

(22) Filed: Jul. 31, 2006

(65) Prior Publication Data
US 2008/0022665 A1   Jan. 31, 2008

(51) Int. Cl.
*F01N 3/10* (2006.01)
(52) U.S. Cl. .............................. 60/301; 60/274; 60/278; 60/280
(58) Field of Classification Search ............ 60/274, 60/278, 280, 287, 288, 301
See application file for complete search history.

(56) References Cited

U.S. PATENT DOCUMENTS

| | | | |
|---|---|---|---|
| 4,131,095 A | 12/1978 | Ouchi | |
| 4,159,699 A | 7/1979 | McCrum | |
| 4,467,602 A | 8/1984 | Iizuka et al. | |
| 4,506,633 A | 3/1985 | Britsch | |
| 5,297,515 A | 3/1994 | Gale et al. | |
| 5,517,976 A | 5/1996 | Bächle et al. | |
| 5,611,203 A | 3/1997 | Henderson et al. | |
| 5,758,493 A * | 6/1998 | Asik et al. | 60/274 |
| 5,778,667 A * | 7/1998 | Kinugasa et al. | 60/274 |
| 5,794,445 A | 8/1998 | Dungner | |
| 5,974,793 A * | 11/1999 | Kinugasa et al. | 60/285 |
| 6,009,709 A | 1/2000 | Bailey | |
| 6,047,542 A * | 4/2000 | Kinugasa et al. | 60/274 |
| 6,119,452 A * | 9/2000 | Kinugasa et al. | 60/285 |
| 6,122,910 A | 9/2000 | Hoshi et al. | |
| 6,134,882 A | 10/2000 | Huynh et al. | |
| 6,216,458 B1 | 4/2001 | Alger et al. | |
| 6,267,106 B1 | 7/2001 | Feucht | |
| 6,286,489 B1 | 9/2001 | Bailey | |
| 6,360,732 B1 | 3/2002 | Bailey et al. | |
| 6,408,833 B1 | 6/2002 | Faletti | |
| 6,543,230 B1 | 4/2003 | Schmid | |
| 6,789,531 B1 | 9/2004 | Remmels | |
| 6,978,772 B1 | 12/2005 | Dorn et al. | |
| 2003/0086850 A1 | 5/2003 | Jobson et al. | |
| 2007/0193270 A1* | 8/2007 | Roozenboom et al. | 60/612 |

* cited by examiner

*Primary Examiner*—Thomas E Denion
*Assistant Examiner*—Diem Tran
(74) *Attorney, Agent, or Firm*—Finnegan, Henderson, Farabow, Garrett & Dunner

(57) ABSTRACT

A power source is provided for use with an exhaust gas recirculation and selective catalytic reduction system. The power source has a main air-intake passage fluidly connected to a first air-intake passage and a second air-intake passage. A first cylinder group may be fluidly connected to the first air-intake passage and a first exhaust passage, wherein the first exhaust passage may include an ammonia-producing catalyst configured to convert at least a portion of a fluid in the first exhaust passage into ammonia. Further, a second cylinder group may be fluidly connected to the second air-intake passage and a second exhaust passage. A third cylinder group may be fluidly connected to the second air-intake passage. The power source may have a recirculation loop that includes the second air-intake passage and the third cylinder group. The power source may also have a merged exhaust passage configured to connect the first exhaust passage and the second exhaust passage to facilitate a reaction between ammonia and NOx to at least partially remove NOx from the merged exhaust passage.

20 Claims, 2 Drawing Sheets

EXHAUST GAS RECIRCULATION AND SELECTIVE CATALYTIC REDUCTION SYSTEM

TECHNICAL FIELD

This disclosure relates generally to an exhaust gas recirculation and selective catalytic reduction system, and more particularly, to a high pressure exhaust gas recirculation system with on-board ammonia production.

BACKGROUND

Engines, including diesel engines, gasoline engines, gaseous fuel-driven engines, and other engines known in the art, traditionally exhaust a complex mixture of pollutants. These emissions may include gaseous and solid material, such as, particulate matter, nitrogen oxides (NOx), and sulfur compounds. Heightened environmental concerns have led regulatory agencies to increase the stringency of emission standards for such engines, forcing engine manufactures to develop systems to further reduce levels of engine emissions.

One method used by engine manufacturers to reduce engine emissions includes exhaust gas recirculation (EGR). EGR systems recirculate a portion of the engine exhaust stream into the air-intake supply of the engine to reduce oxygen concentration within a combustion chamber. Recirculated exhaust gas may further act to lower combustion temperatures, and in combination with reduced oxygen concentration, may lead to reduced emission levels.

Selective catalytic reduction (SCR) provides another method for reducing engine emission levels. During SCR, a catalyst facilitates a reaction whereby ammonia and NOx react in an exhaust stream to produce water and nitrogen gas, thereby reducing NOx levels in the exhaust gas. Generally, the ammonia used for the SCR system may be either produced during engine operation or stored for injection as required. However, because of the high reactivity of ammonia, storage of ammonia can be hazardous. Further, on-board production of ammonia can be costly and may require specialized equipment.

One system configured to reduce emission levels with an EGR system is described in U.S. Pat. No. 6,286,489 ("the '489 patent") issued on Sep. 11, 2001 to Bailey. The '489 patent describes an EGR system in which a portion of the exhaust gas from a first cylinder group is cooled by an exhaust gas cooler before being directed to an intake manifold of an engine. The system further includes a valve configured to adjust a flow rate of exhaust gas from the first cylinder group to the air intake manifold.

While the system of the '489 patent may reduce NOx from an exhaust stream through use of EGR, the system can be further improved. In particular, some engines may operate under conditions whereby an EGR system may not provide sufficient emission reduction. Such engines may benefit by having an additional system configured to further reduce emission levels, such as an SCR system. However, the engine of the '489 patent includes only an EGR system and is not configured to operate with an SCR system that may further reduce emissions.

The present disclosure is directed at overcoming one or more of the limitations in the prior art.

SUMMARY OF THE INVENTION

One aspect of the present disclosure includes a power source for use with an exhaust gas recirculation and selective catalytic reduction system. The power source includes a main air-intake passage fluidly connected to a first air-intake passage and a second air-intake passage. A first cylinder group may be fluidly connected to the first air-intake passage and a first exhaust passage, wherein the first exhaust passage may include an ammonia-producing catalyst configured to convert at least a portion of a fluid in the first exhaust passage into ammonia. Further, a second cylinder group may be fluidly connected to the second air-intake passage and a second exhaust passage. A third cylinder group may be fluidly connected to the second air-intake passage. The power source may include a recirculation loop that includes the second air-intake passage and the third cylinder group. The power source may also include a merged exhaust passage configured to connect the first exhaust passage and the second exhaust passage to facilitate a reaction between ammonia and NOx to at least partially remove NOx from the merged exhaust passage.

A second aspect of the present disclosure includes a method of operating a power source for use with an exhaust gas recirculation and selective catalytic reduction system. The method includes supplying air to a first cylinder group via a first air-intake passage that may be fluidly connected to a main air-intake passage, supplying air to a second cylinder group via a second air-intake passage that may be fluidly connected to the main air-intake passage, and supplying air to a third cylinder group via the second air-intake passage. A first exhaust stream from the first cylinder group may be supplied to a first exhaust passage fluidly connected to the first cylinder group and at least a portion of the first exhaust stream may be converted to ammonia. The method may also include supplying a second exhaust stream from the second cylinder group to a second exhaust passage fluidly connected to the second cylinder group. A third exhaust stream from the third cylinder group may be supplied to a recirculation loop such that at least a portion of the third exhaust stream may be supplied to the second cylinder group and the third cylinder group. Further, the method may include merging the exhaust stream of the first exhaust passage with the exhaust stream of the second exhaust passage to form a merged exhaust stream in a merged exhaust passage fluidly connected to the first exhaust passage and the second exhaust passage.

A third aspect of the present disclosure includes a machine having a power source. The power source may include a main air-intake passage fluidly connected to a first air-intake passage and a second air-intake passage. A first cylinder group of the power source may be fluidly connected to the first air-intake passage, and a second cylinder group and a third cylinder group may be fluidly connected to the second air-intake passage. The machine may also include an exhaust system further including a first exhaust passage fluidly connected to the first cylinder group. A second exhaust passage of the exhaust system may be fluidly connected to the second cylinder group and a recirculation loop may include the third cylinder group and the second air-intake passage. The exhaust system may also include an ammonia-producing catalyst disposed within the first exhaust passage and configured to convert at least a portion of a fluid in the first exhaust passage into ammonia. -Further, the exhaust system may include a merged exhaust passage configured to connect the first exhaust passage and the second exhaust passage to facilitate a reaction between ammonia and NOx to at least partially remove NOx from the merged exhaust passage. Also, the recirculation loop may be configured to supply at least a portion of exhaust gas from the third cylinder group to the second cylinder group and the third cylinder group.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system. In the drawings.

DETAILED DESCRIPTION

Figure 1:
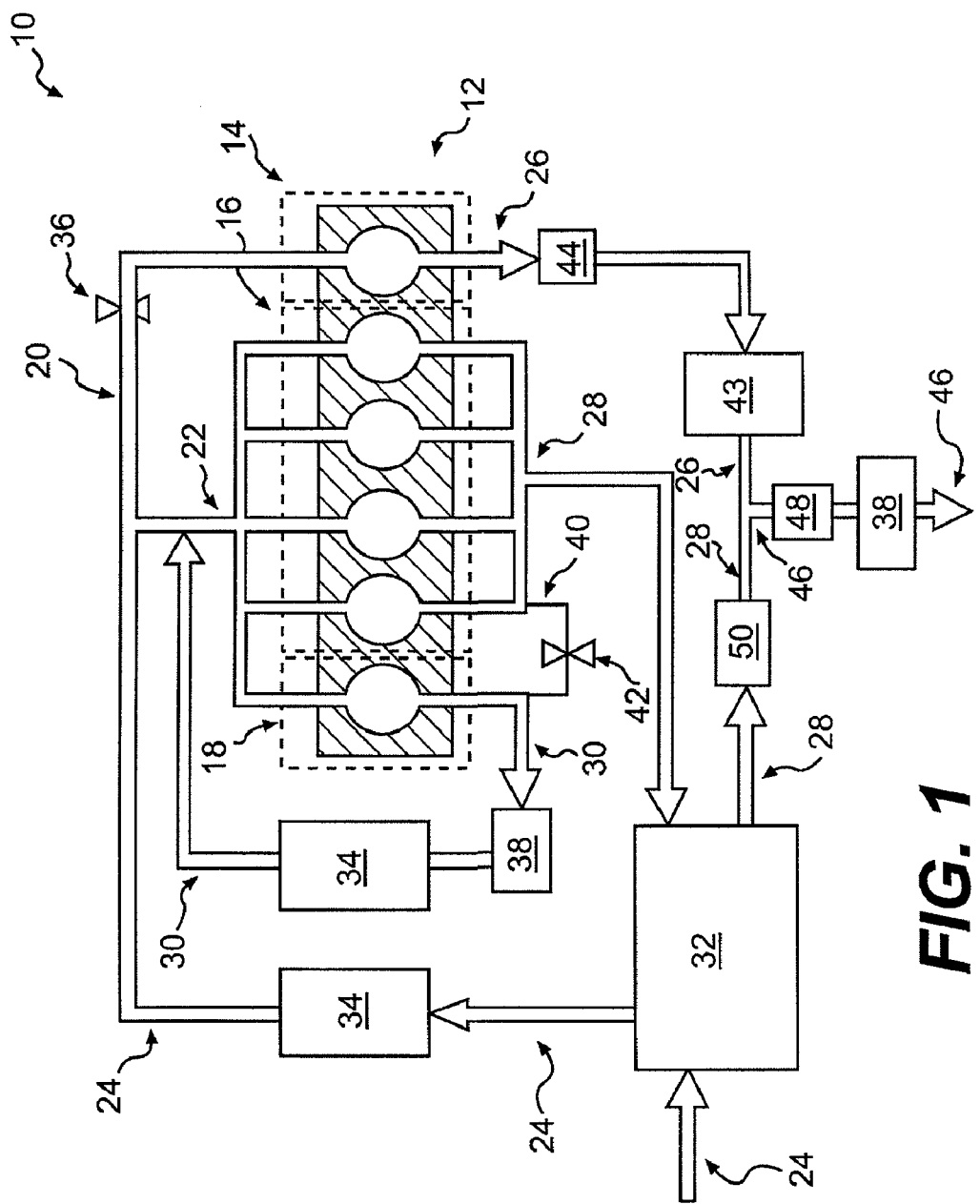
FIG. 1 provides a schematic representation of a machine including a power source according to an exemplary disclosed embodiment.

FIG. 1 provides a schematic representation of a machine 10 of the present disclosure including a power source 12. In some embodiments, power source 12 may include any type of internal combustion engine. For example, power source 12 may include a diesel engine, a gasoline engine, a gaseous fuel-powered engine, or any other engine known in the art. Further, power source 12 may be configured to provide power to an on-highway vehicle, construction or mining equipment, or a factory or power plant.

Power source 12 may include a plurality of cylinders, including a first cylinder group 14, a second cylinder group 16, and a third cylinder group 18. Each of cylinder groups 14, 16, 18 may include one or more cylinders configured to permit fuel combustion in addition, each cylinder group may be configured to operate at different-operating conditions. For example, one cylinder group may be operated to provide power, another cylinder group may be operated to recirculate at least a portion of exhaust gas, and another cylinder group may be operated to produce ammonia for use with an SCR system. In some embodiments, the operational conditions of each cylinder of cylinder groups 14, 16, 18 may be varied by controlling the ratios of air to fuel-vapor injected into each cylinder.

Power source 12 may also include one or more air-intake passages configured to supply one or more cylinders with air and/or fuel. In some embodiments, first cylinder group 14 may be fluidly connected to a first air-intake passage 20, and second cylinder group 16 and third cylinder group 18 may be fluidly connected to a second air-intake passage 22. Further, a main air-intake passage 24 may be fluidly connected to first air-intake passage 20 and second air-intake passage 22, whereby main air-intake passage 24 may provide a single air intake for power source 12. In other embodiments, first air-intake passage 20 may be fluidly isolated from second air-intake passage 22 such that power source 12 may have two separate air intakes.

Main air-intake passage 24 may be configured to receive atmospheric air and supply air to one or more cylinders of power source 12. In some embodiments, main air-intake passage 24 may be operably associated with a forced-induction system 32. Power source 12 may include forced-induction systems to increase power output and/or control the air to fuel-vapor ratios within the cylinders of first cylinder group 14 or second cylinder group 16.

Forced-induction systems may include, for example, turbochargers and/or superchargers. In one embodiment, forced-induction system 32 may include a turbocharger. The turbocharger may utilize the exhaust gas from one or more cylinders of power source 12 to generate power for a compressor (not shown). The compressor may include a fixed geometry type compressor, a variable geometry type compressor, or any other type of compressor known in the art. The compressor may operate to provide additional air to main-air-intake passage 24, first air-intake passage 20, and/or second air-intake passage 22.

In another embodiment, forced-induction system 32 may include a supercharger. A supercharger may include a compressor (not shown) configured to compress air. Power to operate the compressor may be derived from a crank-shaft and transferred to the compressor via a belt connected directly to an engine. As such, superchargers do not need to be operably associated with an exhaust stream from one or more cylinders of power source 12. Further, power source 12 may include one or more turbochargers and/or superchargers, and combinations thereof.

Main air-intake passage 24 may include one or more coolers 34 configured to lower a temperature of a fluid. For example, cooler 34 may include one or more air coolers, such as, a pre-cooler, an inter-cooler, or an after-cooler. Cooler 34 may include any type of cooler, such as, for example, an air-to-air cooler, a water cooler, or suitable heat exchanging device. In some embodiments, cooler 34 may include an air-to-air after-cooler ("ATAAC"), and/or any cooler configured to cool compressed air. It is also contemplated that first air-intake passage 20 and/or second air-intake passage 22 may include one or more coolers 34.

Main air-intake passage 24 may be configured to supply air to first air-intake passage 20 and second air-intake passage 22. In some embodiments, first air-intake passage 20 may include a valve 36. Valve 36 may include any device configured to modify one or more air properties, such as, for example, air pressure, flow rate and/or temperature. Valve 36 may include a throttle, an inductive venturi aperture, or other similar device configured to modify an air property. For example, valve 36 may be configured to reduce air pressure or flow rate downstream of valve 36. Valve 36 may be configured to reduce air pressure within first air-intake passage 20 relative to second air-intake passage 22 such that first cylinder group 14 may be supplied with air at a lower pressure than air supplied to-second and third cylinder groups 16, 18. Supplying first cylinder group 14 and second and third cylinder groups 16, 18 with air at different properties may permit first cylinder group 14 and second and third cylinder groups 16, 18 to operate at different combustion efficiencies and produce different emission levels from each cylinder.

In some embodiments, valve 36 may be configured to selectively modify an air property within first air-intake passage 20 during variable load operation of power source 12. For example, valve 36 may modify an air property based on an operational condition of power source 12, such as, engine speed or engine load. As engine speed increases, valve 36 may be configured to increase the pressure difference between air in first air-intake passage 20 and second-air intake passage 22 by decreasing air flow rate through valve 36.

Second air-intake passage 22 may be configured to supply air and/or fuel to second cylinder group 16 and third cylinder group 18. In some embodiments, second cylinder group 16 may be configured to supply an exhaust stream to provide power to forced-induction system 32, as described above. Second cylinder group 16 may be operated to produce power.

In some embodiments, third cylinder group 18 may be configured to recirculate an exhaust stream to one or more cylinders of power source 12. For example, third cylinder group 18 may be configured to supply an exhaust stream to second air-intake passage 22. In addition, second air-intake passage 22 may be configured to mix a fluid stream from main air-intake passage 24 and the recirculated exhaust stream from third cylinder group 18 to permit one or more cylinders of second cylinder group 16 and third cylinder group 18 to operate with at least a portion of recirculated exhaust gas.

Power source 12 may also include one or more exhaust passages configured to permit exhaust to exit one or more cylinders. In some embodiments, first cylinder group 14 may be fluidly connected to a first exhaust passage 26, and second cylinder group 16 may be fluidly connected to a second exhaust passage 28. In addition; third cylinder group 18 may form part of a recirculation loop 30.

Recirculation loop 30 may include one or more devices and/or systems configured to permit recirculation of at least a portion of an exhaust stream into one or more cylinders of power source 12. In some embodiments, recirculation loop 30 may include third cylinder group 18 and second air-intake passage 22 such that an exhaust stream from third cylinder group 18 may be directed into second air-intake passage 22. In other embodiments, recirculation loop 30 may be fluidly connected to one or more air-intake and/or exhaust passages of power source 12.

Recirculation loop 30 may also include one or more filters 38, such as, for example, a diesel particulate filter 38. Filter 38 may be configured to collect particulate matter, and may be disposed in recirculation loop 30 at any suitable location. Recirculation loop 30 may also include one or more coolers 34, as described above. In addition, one or more valves (not shown) may be provided in recirculation loop 30, wherein the valves may be configured to regulate exhaust flow into second air-intake passage 22. Recirculation loop 30 may also include one or more pumps, compressors or other systems configured to recirculate exhaust gas from third cylinder group 18 into second air-intake passage 22.

In some embodiments, recirculation loop 30 may be fluidly connected to an exhaust shunt 40. In particular, exhaust shunt 40 may be configured to permit exhaust to flow out of recirculation loop 30. For example, exhaust shunt 40 may be fluidly connected to second exhaust passage 28 such that exhaust shunt 40 may permit exhaust from third cylinder group 18 to flow into second exhaust passage 28.

Exhaust shunt 40 may include a valve 42 configured to regulate a flow of exhaust from third cylinder group 18 into second exhaust passage 28. Valve 42 may include any suitable valve type as previously described. In some embodiments, exhaust shunt 40 and valve 42 may be configured to permit variable EGR, wherein a variable portion of exhaust gas may be supplied to one or more cylinders. Further, providing recirculated exhaust gas to second cylinder group 16 and third cylinder group 18 may permit first cylinder group 14 to operate combustion reactions at different efficiencies.

In some embodiments, first cylinder group 14 and second and third cylinder groups 16, 18 may operate with combustion reactions at different efficiencies. Supplying different cylinder groups with air at different properties may permit combustion reactions at different efficiencies within the different cylinder groups. In particular, combustion reactions at different efficiencies may produce different combustion products and different levels of emissions from first cylinder group 14 and second and third cylinder groups 16, 18. For example, supplying first cylinder group 14 with air at a lower pressure than air supplied to second and third cylinder groups 16, 18 may permit first cylinder group 14 to produce an exhaust stream more suitable for ammonia production than second and third cylinder groups 16, 18. Emission levels may also be affected by other operational parameters of power source 12, such as, for example, air to fuel-vapor ratio, valve timing, and/or fuel injection timing.

During operation of power source 12, first cylinder group 14 may operate at or near a stoichiometric air to fuel-vapor ratio. Further, second and third cylinder groups 16, 18 may operate under leaner conditions, wherein lambda is greater than one. Air pressure and/or flow rate may be reduced in first air-intake passage 20 such that first cylinder group 14 may operate at lambda approximately equal to one. Operation of first cylinder group 14 at lambda approximately equal to one may cause increased NOx production by first cylinder group 14 relative to NOx emissions from a leaner combustion reaction within second and third cylinder groups 16, 18. In some embodiments, NOx generated by combustion in first cylinder group 14 may be converted into ammonia, whereby this ammonia may be used to remove NOx produced by second and third cylinder groups 16, 18.

In some embodiments, first exhaust passage 26 may include an ammonia-producing catalyst 43 configured to convert at least a portion of the exhaust stream from first cylinder group 14 into ammonia. In particular, ammonia may be produced by a reaction between NOx and other substances in an exhaust stream from first cylinder group 14. For example, ammonia may be produced by NOx reacting with a variety of other combustion byproducts, such as, $H_2$ (hydrogen gas), $C_3H_6$ (propene), or CO (carbon monoxide).

Ammonia-producing catalyst 43 may be made from a variety of materials. In one embodiment, ammonia-producing catalyst 43 may include at least one of platinum, palladium, rhodium, iridium, copper, chrome, vanadium, titanium, iron, or cesium. Combinations of these materials may be used, and the catalyst material may be chosen based on the type of fuel used, the air to fuel-vapor ratio desired, or for conformity with environmental standards.

The efficiency of conversion of NOx to ammonia by ammonia-producing catalyst 43 may be improved under rich conditions. Therefore, to increase ammonia production, fuel may be supplied to NOx-containing exhaust to produce a rich, NOx-containing exhaust gas that can be used to produce ammonia by ammonia-producing catalyst 43. For example, one or more cylinders of first cylinder group 14 may operate to produce an exhaust-gas stream that contains NOx. The NOx-containing exhaust stream may flow into first exhaust passage 26 where the exhaust stream may be mixed with fuel to create an environment suitable for ammonia production.

To create the rich conditions favorable for ammonia production, a fuel-supply device 44 may be configured to supply fuel into first exhaust passage 26 upstream of ammonia-producing catalyst 43. For example, a NOx-containing exhaust may be supplied to first exhaust passage 26, and fuel-supply device 44 may be configured to supply fuel into first exhaust passage 26, thereby making the exhaust stream rich. Thus, the exhaust stream in first exhaust passage 26 may be rich downstream of fuel-supply device 44, thereby providing an environment suitable for ammonia production.

In some embodiments, first exhaust passage 26 and second exhaust passage 28 may be fluidly connected at a point downstream of ammonia-producing catalyst 43 to form a merged exhaust passage 46. Merged exhaust passage 46 may contain a mixture of an exhaust stream produced by second cylinder group 16 and an ammonia-containing, exhaust stream produced by ammonia-producing catalyst 43 in first exhaust passage 26.

A NOx-reducing catalyst 48 may be disposed in merged exhaust passage 46. NOx-reducing catalyst 48 may facilitate a reaction between ammonia and NOx to at least partially remove NOx from the exhaust stream in merged exhaust passage 46. For example, NOx-reducing catalyst 48 may facilitate a reaction between ammonia and NOx to produce nitrogen gas and water, among other reaction products.

In some embodiments, merged exhaust passage 46 may include one or more filters 38 as previously described. It is also contemplated that first exhaust passage 26 and/or second exhaust passage 28 may include one or more filters (not shown). In addition, any number and type of catalysts may be included in first-exhaust passage 26, second exhaust passage 28 and/or merged exhaust passage 46. These catalysts may include any suitable catalytic device and/or system configured to enhance a chemical reaction. For example, in some embodiments second exhaust passage 28 may include an oxidation catalyst 50. NOx may include several oxides of nitrogen including nitric oxide (NO) and nitrogen dioxide ($NO_2$), and NOx-reducing catalyst 48 may function most effectively with a ratio of $NO:NO_2$ of about 1:1. Oxidation catalyst 50 may be configured to control a ratio of $NO:NO_2$ in second exhaust passage 28 and/or merged exhaust passage 46.

As shown in FIG. 1, power source 12 includes forced-induction system 32 operably associated with main air-intake passage 24 and second exhaust passage 28. It is also contemplated that forced-induction system 32 may be operably associated with any suitable passage, such as, for example, first air-intake passage 20, second air-intake passage 22, first exhaust passage 26, recirculation loop 30, and/or merged exhaust passage 46. Further, power source 12 may include one or more forced-induction systems 32 operably associated with any suitable passage.

In some embodiments, passages 20, 22, 24, 26, 28, 46 may include additional and/or fewer components. For example, first exhaust passage 26 may include a filter (not shown) and/or be operably associated with forced-induction system (not shown). Further, second air-intake passage 22 may include one or more valves (not shown), filters (not shown), and/or coolers (not shown). For example, second air-intake passage 22 may include one or more valves configured to control a flow of gas from recirculation loop 30 into second cylinder group 16 and/or third cylinder group 18.

Figure 2:
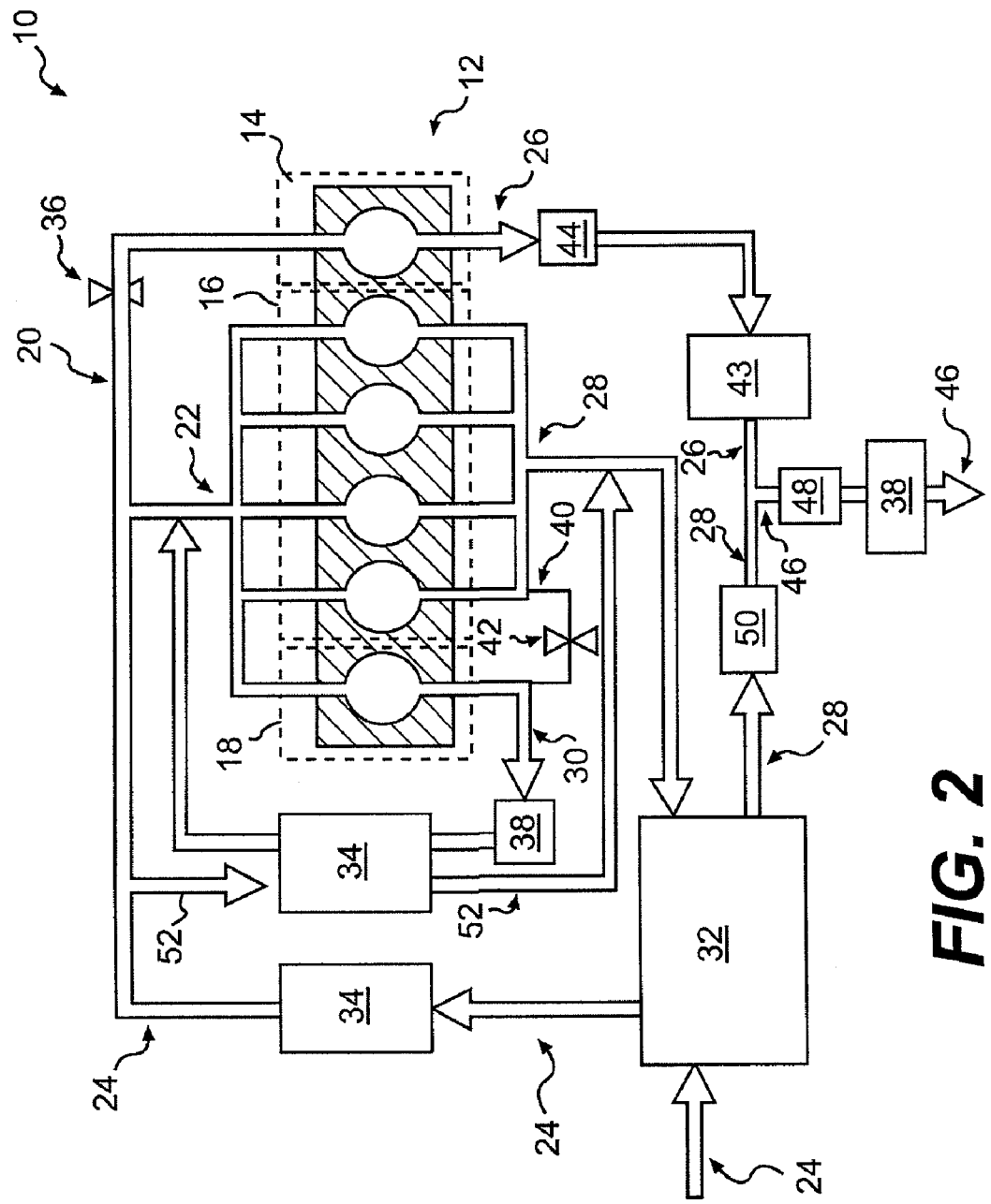
FIG. 2 provides a schematic representation of a machine including a power source according to another exemplary disclosed embodiment.

In some embodiments, main air-intake passage 24 may include one or more filters (not shown) and/or valves (not shown). Alternatively, in the exemplary embodiment shown in FIG. 2, power source 12 may include an air-cooling passage 52 fluidly connected to main air-intake 24. Air-cooling passage 52 may be configured to provide cooling air for cooler 34 configured to at least partially cool a fluid within recirculation loop 30. Specifically, cooler 34 may be a cross flow cooler whereby heat within exhaust gas from third cylinder group 18 may be transferred to air supplied by main air-intake passage 24. Such heat exchange may function to cool exhaust within recirculation loop 30 before directing the exhaust into second air-intake passage 22.

In some embodiments, air-cooling passage 52 may also be fluidly connected to an exhaust passage. For example, air-cooling passage 52 may be fluidly connected to main air-intake 24 and second exhaust passage 28 such that air within main air-intake 24 may be supplied to second exhaust passage 28. Such additional gas flow into second exhaust passage 28 may increase a pressure within second exhaust passage 28 and may improve the performance of power source 12. It is also contemplated that air-cooling passage 52 may further include one or more devices and/or systems as described above, such as, for example, a filter, and a valve.

INDUSTRIAL APPLICABILITY

The present disclosure provides a power source for use with an exhaust gas recirculation and selective catalytic reduction system. The system may be useful in a variety of engine types to reduce emission levels.

The power source of the present disclosure provides a method that may offer improved control of emission levels. In particular, power source. 12 includes recirculation loop 30 configured to recirculate at least a portion of exhaust gas into one or more cylinders to reduce oxygen concentration within the one or more cylinders and reduce NOx production. Recirculation loop 30 may be further configured to clean and/or cool exhaust gas recirculated into power source 12. As a result, levels of particulate matter, and/or other pollutants contained in the exhaust gas may be reduced when the exhaust is recirculated into power source 12. Therefore, recirculation loop 30 may protect power source 12 against problems caused by intake of particles, and/or other pollutants.

In addition, the present disclosure provides a method for permitting variable EGR. Specifically, exhaust shunt 40 and valve 42 may permit variable EGR wherein the portion exhaust gas recirculated into power source 12 may be varied. For example, exhaust shunt 40 and valve 42 may be configured to permit EGR into second air-intake 22 wherein approximately 20% of the fluid within each cylinder of second and third cylinder groups 16, 18 may be exhaust gas. Such variable EGR may permit an engine to produce reduced emission levels over a range of engine operating conditions.

The power source of the present disclosure may provide improved control of ammonia production and NOx emissions. To increase ammonia production, one cylinder group may operate under lean conditions, while another cylinder group may operate under approximately stoichiometric conditions to facilitate ammonia production. Fuel may also be injected into the high NOx-containing exhaust stream to produce a rich, NOx-containing exhaust that may be converted to ammonia for use with an SCR system. The combined EGR and SCR system may permit greater reduction of emissions than use of an EGR system or SCR system alone.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A power source for use with an exhaust gas recirculation and selective catalytic reduction system, comprising:

a main air-intake passage fluidly connected to a first air-intake passage and a second air-intake passage;

a first cylinder group fluidly connected to the first air-intake passage and a first exhaust passage, wherein the first exhaust passage includes an ammonia-producing catalyst configured to convert at least a portion of a fluid in the first exhaust passage into ammonia;

a second cylinder group fluidly connected to the second air-intake passage and a second exhaust passage;

a third cylinder group fluidly connected to the second air-intake passage;

a recirculation loop that includes the second air-intake passage and the third cylinder group; and a merged exhaust passage configured to connect the first exhaust passage and the second exhaust passage to facilitate a reaction between ammonia and NOx to at least partially remove NOx from the merged exhaust passage.

2. The power source of claim 1, wherein the recirculation loop includes a filter.

3. The power source of claim 1, wherein the first air-intake passage includes a valve.

4. The power source of claim 1, wherein a cooler is operably associated with at least one of the main air-intake passage and the recirculation loop.

5. The power source of claim 4, wherein the cooler includes at least one of an air-to-air cooler or a water cooler.

6. The power source of claim 5, wherein the air-to-air cooler further includes an air-cooling passage fluidly connected to the main air-intake passage and the second exhaust passage.

7. The power source of claim 1, wherein the recirculation loop is fluidly connected to an exhaust shunt fluidly connected to the second exhaust passage.

8. The power source of claim 7, wherein the exhaust shunt includes a valve.

9. The power source of claim 1, wherein the power source further includes a forced-induction system operably associated with at least one of the main air-intake passage, the first air-intake passage, the second air-intake passage, the first exhaust passage, the second exhaust passage, the recirculation loop, or the merged exhaust passage.

10. The power source of claim 9, wherein the forced-induction system includes a component of at least one of a turbocharger and a supercharger.

11. A method of operating a power source for use with an exhaust gas recirculation and selective catalytic reduction system, comprising:

supplying air to a first cylinder group via a first air-intake passage that is fluidly connected to a main air-intake passage;

supplying air to a second cylinder group via a second air-intake passage that is fluidly connected to the main air-intake passage;

supplying air to a third cylinder group via the second air-intake passage;

supplying a first exhaust stream from the first cylinder group to a first exhaust passage fluidly connected to the first cylinder group and converting at least a portion of the first exhaust stream to ammonia;

supplying a second exhaust stream from the second cylinder group to a second exhaust passage fluidly connected to the second cylinder group;

supplying a third exhaust stream from the third cylinder group to a recirculation loop such that at least a portion of the third exhaust stream is supplied to the second cylinder group and the third cylinder group; and merging the exhaust stream of the first exhaust passage with the exhaust stream of the second exhaust passage to form a merged exhaust stream in a merged exhaust passage fluidly connected to the first exhaust passage and the second exhaust passage.

12. The method of claim 11, wherein the method further includes at least partially filtering the third exhaust stream.

13. The method of claim 11, wherein the method further includes shunting at least a portion of the third exhaust stream into the second exhaust stream via an exhaust shunt fluidly connected to the recirculation loop and the second exhaust passage.

14. The method of claim 11, wherein the method further includes using a forced-induction system operably associated with at least one of the main air-intake passage, the first air-intake passage, the second air-intake passage, the first exhaust passage, the second exhaust passage, the recirculation loop, or the merged exhaust passage.

15. The method of claim 11, wherein the method further includes cooling a fluid in at least one of the main air-intake passage and the recirculation loop.

16. The method of claim 15, wherein cooling the fluid further includes supplying air to an air-cooling passage fluidly connected to the main air-intake passage and the second exhaust passage.

17. A machine, comprising:
a power source including:
a main air-intake passage fluidly connected to a first air-intake passage and a second air-intake passage;
a first cylinder group fluidly connected to the first air-intake passage;
a second cylinder group and a third cylinder group fluidly connected to the second air-intake passage;
an exhaust system including:
a first exhaust passage fluidly connected to the first cylinder group and a second exhaust passage fluidly connected to the second cylinder group;
a recirculation loop that includes the third cylinder group and the second air-intake passage;
an ammonia-producing catalyst disposed within the first exhaust passage and configured to convert at least a portion of a fluid in the first exhaust passage into ammonia;
a merged exhaust passage configured to connect the first exhaust passage and the second exhaust passage to facilitate a reaction between ammonia and NOx to at least partially remove NOx from the merged exhaust passage; and
wherein the recirculation loop is configured to supply at least a portion of exhaust gas from the third cylinder group to the second cylinder group and the third cylinder group.

18. The machine of claim 17, wherein a cooler is operably associated with at least one of the main air-intake passage and the recirculation loop.

19. The machine of claim 17, wherein the recirculation loop is fluidly connected to an exhaust shunt fluidly connected to the second exhaust passage.

20. The machine of claim 17, wherein the machine further includes a forced-induction system operably associated with at least one of the main air-intake passage, the first air-intake passage, the second air-intake passage, the first exhaust passage, the second exhaust passage, the recirculation loop, or the merged exhaust passage.

* * * * *